United States Patent [19]

Schupack

[11] Patent Number: 4,617,219
[45] Date of Patent: Oct. 14, 1986

[54] THREE DIMENSIONALLY REINFORCED FABRIC CONCRETE

[76] Inventor: Morris Schupack, 37 Split Rock Rd., South Norwalk, Conn. 06854

[21] Appl. No.: 685,481

[22] Filed: Dec. 24, 1984

[51] Int. Cl.$^4$ .................................................. B32B 5/12
[52] U.S. Cl. ................................. 428/113; 52/782; 264/333; 404/70; 428/105; 428/247; 428/284; 428/288; 428/221; 428/703
[58] Field of Search ................ 428/703, 221, 70, 247, 428/284, 288, 105, 113; 52/782; 264/333; 404/70

[56] References Cited

U.S. PATENT DOCUMENTS

| | | | |
|---|---|---|---|
| 2,677,955 | 5/1954 | Constantinesco | 428/221 |
| 4,159,361 | 6/1979 | Schupack | 428/240 |
| 4,344,804 | 8/1982 | Bijen et al. | 428/703 |
| 4,373,981 | 2/1983 | Bömers et al. | 428/703 |

OTHER PUBLICATIONS

B. Currie et al, N.I. Quarrying Yearbook, 1984, pp. 11-15.
T. Gardiner et al, Proceeding of Third International Conference of Plastics & Rubber Industry "Polypropylene Fibers & Textiles", Oct. 1983.
T. Gardiner et al, International Journal of Cement Composites and Lightweight Concrete, vol. 5, No. 3, pp. 193-197.

Primary Examiner—James J. Bell
Attorney, Agent, or Firm—St. Onge Steward Johnston & Reens

[57] ABSTRACT

Reinforced cement structures are provided which are reinforced in three dimensions and comprise at least one nonwoven spatial fabric reinforcing material encapsulated in a cementitious composition which preferably has controlled water bleed characteristics. The cementitious composition comprises, for example, hydraulic cement, a gelling agent, water and optionally a dispersing agent. The nonwoven fabric reinforcing material can extend substantially throughout the whole of the cement structure. Alternatively, a plurality of reinforcing layers can be utilized in a sandwich or composite type structure in which the various reinforcing layers are separated by a layer of cementitious composition. The nonwoven fabric reinforcing material can also have, on at least one of its surfaces, a woven or nonwoven scrim reinforcing material to impart additional strength properties to the structure.

The structures can take the form of panels which can be cold formed into curved structures. The structures can also take the form of load-bearing structures suitable for use as roadbeds, in bridge construction and the like.

22 Claims, 5 Drawing Figures

THREE DIMENSIONALLY REINFORCED FABRIC CONCRETE

BACKGROUND OF THE INVENTION

1. Field of the Invention

The present invention relates to reinforced concrete structures and to methods for their preparation and is more particularly concerned with the preparation of non-woven fabric reinforced concrete structures which can take the form of panels, load-bearing decks, roadbeds, walls and the like.

2. Description of the Prior Art

In my previous U.S. Pat. No. 4,159,361 there is described a reinforced panel structure which comprises a panel core formed from a cementitious composition having controlled water bleeding characteristics and having a fabric reinforcing layer disposed in the panel core adjacent to at least one surface thereof. The panel is capable of being bent, after setting, into a curved structural member without substantial loss of structural strength. The combination of materials and the mode of construction of these panels represented a marked improvement, particularly in the ability to be flexed after forming, over those previously known in the art. The relevant prior art is discussed in detail in the aforesaid U.S. Pat. No. 4,159,361, the two most closely related structures being those shown in U.S. Pat. No. 3,284,980 (Dinkel) and U.S. Pat. No. 3,466,822 (Hull et. al.). I am also aware of the recent disclosure by Bijen et al., Concrete International 1980, Fibrous Concrete, p. 194 et seq. The Construction Press, New York, of the use of fibrillated stretched polyolefin film as a reinforcing material for cement structures.

I have now found that the structural strength properties of the reinforced structures shown in the aforesaid U.S. Pat. No. 4,159,361 can be markedly improved in a manner which will be described in detail below. The modifications and improvements in the prior structures which are described herein not only relate to the preparation of cold formable panel structures disclosed in the prior art but also provide the possibility of producing load-bearing structures such as can be employed in bridge decks, highways, and the like. In addition, the structures of the present invention can be produced readily and economically on a continuous basis.

SUMMARY OF THE INVENTION

The present invention in its broadest aspect comprises a reinforced cement structure having at least one nonwoven spatial fabric reinforcing layer encapsulated in preferably a water-retentive cementitious composition having controlled water bleed characteristics. In one embodiment of the invention the nonwoven fabric reinforcing layer extends throughout substantially the whole of the reinforced structure and imparts reinforcement in all three dimensions of the structure. In another embodiment of the invention a plurality of such reinforcing layers is utilized to form a sandwich structure in which the various reinforcing layers are separated by a layer of cementitious composition. The use of the nonwoven fabric reinforcing material is the feature which principally distinguishes the structures of the present invention from those shown in the prior art, particularly my earlier patent U.S. Pat. No. 4,159,361. It is the presence of the nonwoven spatial fabric reinforcing material which imparts the markedly improved properties to the structure of the invention as will be discussed more fully below.

In a further embodiment of the invention the nonwoven spatial fabric reinforcing material employed in the structures of the invention is provided on at least one of its surfaces and preferably on both of its surfaces with a woven or non-woven scrim fabric reinforcing material. The use of such a combination is found to impart structural strengh properties to the structures of the invention which are superior to those which would be expected from the known effects of the scrim alone and/or the nonwoven fabric reinforcing layer when used alone.

While the scrim and the spatial fabric reinforcing material can be employed as separate entities which are not physically attached to each other prior to incorporation into the structures of the invention, it is preferred that the two are attached to each other, by appropriate means such as needle punching and the like, before being utilized in the structures of the invention. This effectively minimizes the possibility that delamination can occur at the boundary between the two materials.

The structures of the invention can take the form of sheets or panels which can be utilised as such in building structures or, depending upon their thickness, can be cold worked into curved structures such as drums for cable reels, culverts, pipes, ducts, concrete forms and the like. In a particular embodiment of the invention the structures can take the form of load-bearing members such as bridge decks, roadbeds, and load-bearing walls. Such load-bearing structures of the invention, which incorporate non-ferrous reinforcement, possess marked advantages over conventional steel reinforced concrete structures of this type. Thus, they are not subject to deterioration because of corrosion and degradation of the reinforced concrete members which can occur so quickly and with such potentially dangerous consequences in the case of steel reinforcing members in conventional bridge deck structures, car parking structures, marine structures, and the like.

The three dimensionally reinforced structures of the invention show significant advantages over like structures previously known, particularly those described in my earlier U.S. Pat. No. 4,159,361. The structures exhibit improved flexural compressive, and shear strength and, in the case of the sheets or panels of the invention, enhanced bendability into curved structures without significant loss of structural strength. In addition, the panel structures of the invention have significantly improved edge strength which permits holes to be drilled or nails to be driven through the materials much closer to the edges. These latter properties are of particular significance where the structures of the invention take the form of panels or sheets which are used in construction in place of plywood and the like. It is further found that the structures of the invention, when employed in the form of thin panels or sheets, can be subjected to bending to form shell-type structures of limited double curvature.

The invention also comprises processes for the preparation of the three dimensionally reinforced structures and, in particular, is concerned with methods for the continuous manufacture of such structures.

Accordingly, it is an object of the present invention to provide a reinforced concrete structure which can be produced readily and inexpensively and, in the case of those structures in the form of relatively thin sheets, can be cold-formed into a variety of products. It is a further object of the invention to provide simple and inexpensive methods for making such structures. Yet a further object of the invention is to provide load bearing structures having improved properties as compared with comparable steel-reinforced concrete structures.

Other objects, aspects, and advantages of the present invention will be pointed out in the following description, or will be readily apparent therefrom.

DETAILED DESCRIPTION OF THE INVENTION

Figure 1:
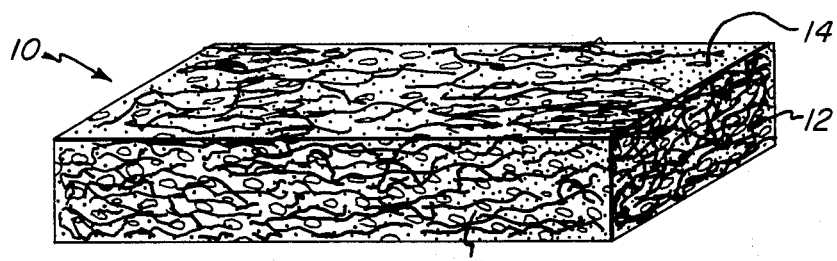
FIG. 1 is a perspective view of a reinforced concrete structure made in accordance with an embodiment of the invention.

The principal feature of the structures of the invention which distinguishes these from similar structures previously known in the art, and which serves to confer upon the present structures their outstanding properties, lies in the use of a nonwoven spatial fabric as the reinforcing material. A wide variety of nonwoven fabrics produced from a wide variety of fibers, both natural and synthetic, are available and can be employed in the structures of the invention. The nonwoven fabrics are usually comprised of fleece-like mats or felts of substantially continuous fibers arranged in a nonoriented manner.

The term "spatial" is used herein to indicate that the nonwoven fabric reinforcing material is three dimensional in nature and that the fibers in said fabric serve to enclose a multitude of interconnecting voids which become permeated by the cementitious compositions employed in preparing the structures of the invention. In many instances, the continuous fibers in the mats or felts are held in place by needle punching or, particularly in the case of fibers derived from synthetic polymers, by melt bonding of the individual fibers to each other at points of intersection. The average dimension of the voids in the fabrics varies over a wide range depending upon the particular nature of the structure and the use for which it is designed. Thus, in general, the fabrics which are employed in preparing the relatively thin sheets or panels are generally those in which the voids are relatively small in size, i.e., the fibers in the mat or felt are relatively tightly packed. In contrast, the fabrics employed in the load bearing structures of the invention are generally those having loosely packed fibers with relatively large voids which permit relatively quick permission of the fabric by the cementitious compositions employed. As will be apparent, the average size of the voids in any given fabric is a factor which determines the size of the particular material employed in the cementitious composition and the water retentive properties of the latter composition, if any, depending on the filtering action, if any, of the spatial reinforcement.

Illustrative of the non-woven fabrics which can be employed are those prepared from glass fibers, carbon fibers, stainless steel, epoxy coated carbon steel, synthetic polymeric fibers such as polyolefins (polypropylene preferred), polyamides, polyimides and the like.

Illustrative of the non-woven spatial fabrics which can be employed in preparing the structures of the invention are the continuously spun needle punched polyester-based fabrics available under the name TREVIRA ® SPUNBONDS from Hoechst Fiber Industries and spun-bonded polypropylene-based fabrics available under the trade name FIBRETEX from Crown-Zellerbach.

In a particular and preferred embodiment of the invention the non-woven spatial fabric is provided on at least one, and preferably on both surfaces, with a scrim fabric layer of material which can be woven or non-woven and can be fabricated from any of the various fiber materials utilized in the non-woven spatial fabric as discussed above. The scrim layer can be unattached to the non-woven spatial fabric but is preferably bonded thereto by any appropriate means such as needle punching, melt bonding and the like. Illustrative of scrim non-woven fabrics which can be employed is that which is available under the trade name TYPAR from DuPont and which is formed from continuous filaments of polypropylene positioned preferentially along the length and breadth directions of the scrim and bonded at the filament junctions.

When the non-woven spatial fabric being utilised is one having relatively large voids, as in the case of the fabrication of relatively large, high load-bearing structures of the invention, the scrim fabric used in conjunction therewith can itself be of relatively large open weave. Illustrative of such scrim fabrics are those which are available under the trade-mark PARAGRID from Imperial Chemical Industries. These fabrics comprise polyester strands with multiple strands alongside each other and enclosed in a jacket of polyolefin or polyamide. The jacketed strands are arranged in the form of a grid having a wide mesh with the jacketed strands aligned in parallel in one direction being bonded at the crossover points to a series of jacketed strands aligned in parallel in a direction at right angles to the first series of strands.

In the case of structures of the invention prepared using cement which is alkaline in reaction, it is necessary to pretreat those fibers such as glass, polyester and polyamide fibers which are subject to degradation on exposure to alkali. In general this can be accomplished readily by coating the fibers with an alkali resistant coating such as an epoxy resin.

In the reinforced cement structures of the invention the cementitious composition employed is such that it will substantially completely premeate the matrix of the nonwoven fabric reinforcer and so encapsulate the latter, and, in a preferred embodiment, leaving the fabric reinforcer substantially completely distributed throughout the entirety of the finished structure. Since the non-woven fabric has fibers which are not oriented and in fact are disposed in random fashion in all directions, it is apparent that the resulting structure formed from the fabric and the cementitious composition has reinforcement in all three dimensions.

The cementitious compositions which are employed in preparing the structures of the invention must be capable of permeating substantially completely throughout the interstices between the individual fibers of the non-woven fabric. This permeation should obviously occur without any significant amount of the solid particulate material in the composition being filtered and without any fluid material having a reduced solids content (i.e., an increased water to cement ratio) passing through the fabric. The latter event will give rise to a water "lens" on the surface of the resulting structure which lens is an area of inferior properties. As recognized in the art, to achieve optimum properties in a cement-structure the ratio by weight of water to cement advantageously should not exceed 0.5 and, preferably, should not exceed 0.3. If filtration of solids in the cementitious compositions were to take place during passage through the non-woven fabric layer the water to cement ratio in the composition would be affected deleteriously with the consequent weakening of properties in affected areas of the resulting structure.

Accordingly, depending upon the characteristics of the non-woven spatial fabric used, it is necessary to carefully control the nature and proportions of the components present in the cementitious compositions employed in accordance with the invention. Thus, where the voids in the non-woven spatial fabric are relatively large, as is the case in the large load-bearing structures of the invention, and there is no filtering or screening action exerted by the fabric on the cementitious composition employed, the latter composition can be any of those previously employed in preparing reinforced concrete structures. However, where the voids in the non-woven spatial fabric are relatively small and the fabric exerts a significant filtering or screening action, it is necessary to employ cementitious compositions which possess the required degree of water-retentive properties.

In my previous U.S. Pat. No. 4,159,361 there are described compositions which comprise a hydraulic cement, a gelling agent, a dispersing agent and water. Such compositions possess water retentive properties which enable them to be utilized on the preparation of those structures of the present invention where such properties are required. However, it has been found that the presence of a gelling agent alone, without the concomitant use of a dispersing agent, can provide the necessary water retentive properties when used in conjunction with certain types of non-woven fabric reinforcing material.

A wide variety of commercially available gelling agents and dispersing agents can be utilized in preparing the cementitious compositions. The most appropriate concentrations in which to employ any given gelling agent, alone or in combination with any given dispersing agent, can be determined, in the case of any given cement composition, by a simple bleed control test such as that described in my U.S. Pat. No. 3,762,937 in Column 4, Lines 23 to 34.

In general, it is found that the gelling agent is employed in the range of about 0.05 to about 1.5 percent by weight based on total weight of the cement. The dispersing agent, if employed, is present in an amount in the same range of percentage by weight. The precise amounts of each agent used in any particular case will vary depending upon the nature of the other components, i.e., the cement and an aggregate if present, and also on the consolidation methods, the finish requirements of the ultimate structure, the filtering characteristics of the non-woven fabric to be encapsulated, and the like. The most appropriate concentrations of the agents, and the relative proportions thereof when used in combination, can be determined readily by one skilled in the art by use of the above-described test as well as by a process of experimentation based on trial and error.

As set forth above, any of a wide variety of known gelling agents can be employed. Illustrative of these are those based on hydroxyethyl cellulose such as that available from Hercules, Inc. under the trademark "NATROSOL" and those based on methyl cellulose such as that available from Dow Chemical Company under the trademark "METHOCEL."

Suitable dispersing agents include ligninsulfonates such as those available under the trademarks "MARACON A," sold by American Can Co. and "NOPCOSANT" and superplasticizers such as "LOMAR D" sold by Nopco Chemical Co. "NOPCOSANT" is comprised of a sulfonated naphthalene and "LOMAR D" is a highly polymerized naphthalene sulfonate which is commercially supplied as a sodium salt.

Aggregates, if used in the cementitious composition can be selected in accordance with the desired finished panel density, surface finish, flexibility, compression strength and nailability. For example, lightweight aggregates such as obtained from expanded forms of slag, clay, shale and slate, produce concrete having a density of from about 80 to 115 pounds per cubic foot. Ultralightweight material such as closed-cell glass beads and plastic such as polystyrene beads can produce ultralight concrete having a density as low as 20 pounds per cubic foot oven dry. So-called normal weight aggregates produce concrete that has a plurality of from about 140–155 pounds per cubic foot. The rocks which comprise most normal weight aggregates are limestone, quartz, quartzite sandstone, dolomite, trap rock, granite and combinations thereof. In general, however, those structures of the invention which are in the form of panels require the use of a lightweight or ultra-lightweight aggregate to obtain a compression strain of the panel core which is compatible with the tensile strain of the fabric reinforcing layers if they are to be bent or to have the ability to be substantially deflected without flexural compression failure as evidenced by cracking on the compression side of the panel. The particle size of any aggregate employed will be limited by the screening or filtering characteristics of the non-woven fabric and the scrim material where one is employed.

It is also desirable to use a cementitious composition, with or without aggregate, which is cellular because of entrained or entrapped air. An air-entrained composition produces a lightweight concrete which has enhanced compression strain characteristics. In a preferred embodiment of the invention a foaming agent, an air entraining agent, or prefoamed material, is added to the cementitious composition in such amounts as to render the finished panel core cellular to the extent of up to approximately 70% and having a density in the range of about 30 to about 120 pcf. In the case of air-entrained compositions it is found desirable to employ a combination of gelling and dispersing agents in the cementitious compositions in order to control foam stability. The use of a gelling agent alone is generally not sufficient in the case of these foam compositions for reasons which are not fully understood.

A typical embodiment of a reinforced structure in accordance with the invention is shown in FIG. 1. The embodiment there shown is of a panel (10) provided with a nonwoven spatial fabric reinforcing material (12) which is completely embedded in a cementitious composition and substantially uniformly distributed there-through. The face (14) of the panel (10) generally has fibers of the reinforcing layer incorporated therein and clearly visible. For particular uses this face (14) may be coated with any suitable coating agent such as one based on a polymer such as methyl methacrylate, to provide a special surface in the event that particular functional or aesthetic considerations are important.

Figure 2:
FIG. 2 is a perspective view of a nonwoven fabric reinforcement employed in an embodiment of the invention.

FIG. 2 shows a section of nonwoven spatial fabric reinforcing material (12) corresponding to that which is shown incorporated in the structure of the invention illustrated in FIG. 1.

Figure 3:
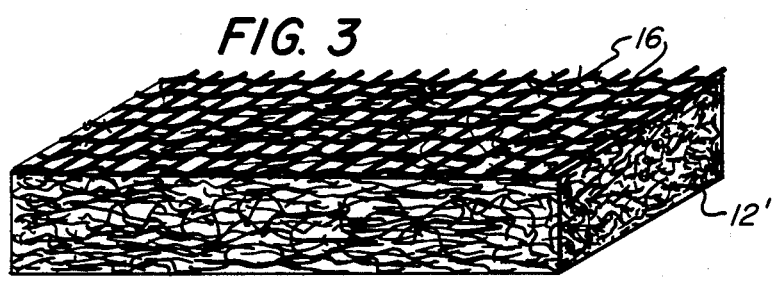
FIG. 3 is a another embodiment of a reinforcing layer employed in the structures of the invention.

FIG. 3 shows a preferred embodiment of a modified form of reinforcing material employed in the structures of the invention. In this preferred embodiment the nonwoven spatial fabric reinforcing material (12') is provided on one surface thereof with a layer of woven or non-woven scrim reinforcing fabric material (16). This latter material becomes encapsulated in or close to the surface of the resulting structure into which it is incorporated, such as that shown in FIG. 1. For greater overall strength a second layer of reinforcing fabric material is also incorporated on the other side of sheet (12').

The woven or non-woven scrim reinforcing layer (16) can be fabricated from any of the same fibers which are compatible with the end use and the matrix used.

The choice of scrim fabrics employed in any given instance is governed largely by the particular structure which is being fabricated. Thus, where high structural strength is desired the scrim is preferably one having a high modulus of elasticity of the order of $10 \times 10^6$ psi or higher. Where a sheet or panel structure which is to be cold formable is being fabricated the scrim fabric should have relatively close spacing of the yarn, have a modulus of over about $1 \times 10^6$ psi and be bonded to the spatial fabric reinforcing element, in order to ensure optimum crack control on bending of the resulting structure. However, if loss of strength after bending is not a concern the scrim fabric employed can have a modulus as low as $0.5 \times 10^6$ psi to facilitate bending. Where ease of cutting the reinforced structure with hand tools as in the case of relatively thin sheets or panels, is a prime consideration, the use of scrim fabric having a modulus of less than $10 \times 10^6$ psi is advantageous.

Figure 4:
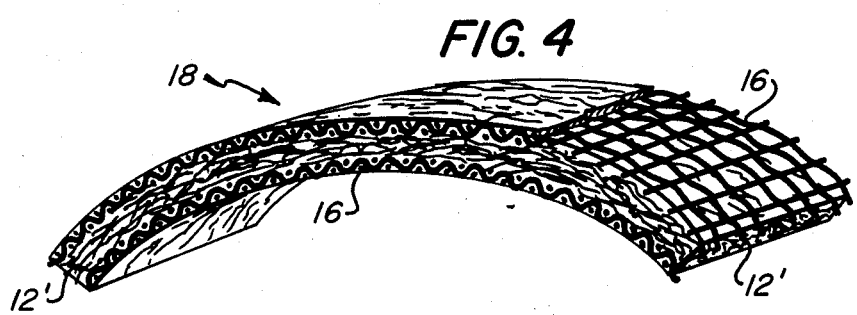
FIG. 4 is a perspective view, partly broken away to show detail, of a reinforced panel structure made in accordance with the invention.

FIG. 4 illustrates a panel made in accordance with the invention using a reinforcing element such as that shown in FIG. 3 where the nonwoven fabric (12') has a woven scrim fabric (16) on each face. The panel (18) shown in FIG. 4 is illustrated in the curved position, having been bent from the planar position by manual pressure. Part of the surface of the panel is shown cut away in order to illustrate the construction of the interior of the panel.

The degree to which the panels made in accordance with the invention can be bent, in the manner illustrated in FIG. 4, depends on a number of factors, principally on the thickness of the panel itself. For example, it is found that a panel as shown in FIG. 4 which has a thickness of about one-eighth of an inch can be bent into a curved structure having a radius of approximately six inches. Similarly, panel structures having thicknesses of three-sixteenths of an inch may be bent to a radius of nine inches and those having a thickness of one-quarter inch may be bent to a radius of less than twelve inches. This bending is achieved with very fine, controlled, and almost imperceptible cracks being formed depending on proper fabric choice. In general it is found that the ease with which the panels constructed in accordance with the present invention can be bent into curved shapes is significantly greater than in the case of the corresponding panels made in accordance with U.S. Pat. No. 4,159,316 because of the high compression strain properties of the structure of this invention.

Figure 5:
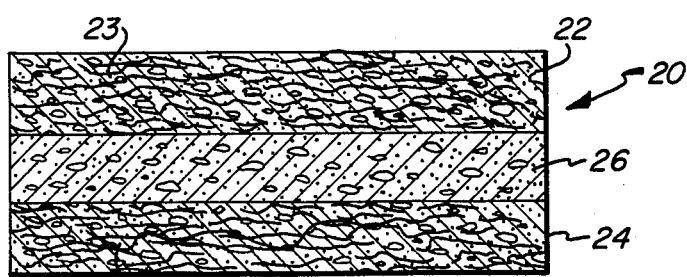
FIG. 5 is a cross-sectional view of another reinforced structure of the invention.

FIG. 5 illustrates, in a cross-sectional view, a sandwich structure (20) in accordance with the invention. This structure comprises two layers (22) and (24) which are formed from a hydraulic cement matrix with or without aggregate fillers and reinforced with nonwoven spatial fabric elements (23) and (25) and which are separated from each other by a layer of mortar or concrete (26) which may or may not be of the same composition as the cementitious composition employed in the two outer layers. The thickness of the two reinforced outer layers (22) and (24) can be the same or different and the relative thickness of the two outer layers versus the thickness of the inner mortar or concrete layer can be varied over a wide range depending upon the particular application for which the resulting structure is to be employed. The inner layer of mortar or concrete (26) can be reinforced, if desired, by means such as chopped fibers and the like to impart additional structural strength to the sandwich structures of the invention. The particular embodiment illustrated in FIG. 5 has two outer reinforcing layers enclosing a mortar or concrete core. However, as will be apparent to one skilled in the art, sandwich structures in accordance with the invention can be provided in which there are a plurality of non-woven spatial fabric reinforced layers each of which is separated from its neighbour by a layer of mortar or concrete.

The reinforced structures of the invention can be prepared conveniently in a straight-forward manner, either on a batch basis or on a continuous basis. In the batch preparation, the reinforcing member such as that illustrated in FIGS. 2 and/or 3 above, is placed in a tray or mold the surface of which advantageously has been previously treated with a conventional mold release agent. An appropriate amount of cementitious composition necessary to completely saturate and encapsulate the reinforcing member is then deposited on the latter. Means such as vibration, ultrasonic stimulation, and the like, can be employed in order to ensure thorough permeation of the reinforcing member by the cementitious composition. The upper surface of the mix can then be screeded if desired in order to ensure a planar surface of the desired finish. Thereafter the impregnated reinforcing material is caused to cure by any conventional means.

An appropriate method of preparing the reinforced structures of the invention on a continuous basis comprises dispensing a continuous web of the nonwoven fabric reinforcing material from a suitable supply roll and placing the continuous web on a moving belt. The latter conducts the web continuously through a zone in which the cementitious composition is being deposited at an appropriate rate with mechanical agitation as desired, to provide the necessary saturation of the web or nonwoven fabric. After deposition of the cementitious composition the impregnated web is subjected to screeding and finishing if desired to produce the required surface of the structure and then the composite is conducted to a zone in which curing takes place. The continuous length of finished structure so prepared can then be cut into appropriate lengths if so desired. With an appropriately accelerated cement composition the sheet can be cut and stacked prior to final cure.

In place of the single layer of nonwoven reinforcing fabric employed in preparing the structures of the invention, one can employ a plurality of such layers stacked one upon the other, so as to prepare any desired thickness of structure. In this manner, it is possible to provide load-bearing structures in accordance with the invention such as bridge decks and roadbeds. In the latter case, the roadbed can be prepared and installed in a continuous operation at the site using the type of continuous operation described above. In such an instance, the apparatus necessary to coat the continuous web of reinforcing material is mounted on a truck or other movable structure and the impregnated continuous web is dispensed off the vehicle directly on to the prepared road surface and allowed to cure in place.

If desired, the non-woven spatial fabric and the scrim (if employed) can be stretched under tension prior to the addition of the cement composition to impart a desired level of prestress and the cement composition can be dispensed on to the stressed fabric using conventional bridge deck or road concreting equipment. As will be obvious to one skilled in the art, the fabric employed in such prestressed structures should be possessed of low creep properties in order that it will maintain tension after release of the stretching means.

The following descriptions of typical structures in accordance with the invention are offered for purposes of exemplification only and are not to be construed as limiting.

EXAMPLE 1

Two reinforced structures of the invention were prepared as follows:

The non-woven spatial reinforcing layer using in each case was a J. B. Group polyester fiber fleece approximately 0.25 inches thick wherein the continuous fibers were randomly oriented and tightly packed. The fleece was provided on each side with a polyester fiber scrim bonded to the fleece. In the case of Panel 1 a woven KEVLAR ® (Du Pont) fabric having 2.5 yarns/in. in the warp and 5 yarns/in. in the fill or tie yarn (fabric strength in the warp direction 150 lbs/in.) was stitched on each surface of the fleece. In the case of Panel 2 the fleece was used alone, without any additional facing fabric. The cementitious composition used in each case was prepared by thorough mixing of the following ingredients (all amounts in pounds except where indicated).

|  | Panel 1 | Panel 2 |
| --- | --- | --- |
| Cement | 11 | 18 |
| Water | 4.73 | 7.74 |
| Gelling agent (NATROSOL 250H) | — | 0.032 |
| Dispersing agent (LOMAR D) | — | 0.032 |
| Inert fines | — | 0.064 |
| Air entrapping agent (PALMOLIVE Liquid) | 1.25 fluid oz. | 2.08 fluid oz. |

The procedure employed in preparing the two panels was as follows. An open mold having dimensions approximately 30"×6" and a depth of 0.25" (Panel 1) or 0.2" (Panel 2) was assembled from appropriate pieces of wood having Formica on all surfaces to be contacted with cementitious composition. The Formica surfaces were coated with a proprietary release agent (CRETELEASE ®). A thin layer of the cementitious composition was placed on the floor of mold and the reinforcing material (previously cut to the dimensions of the floor of the mold) was placed on the layer of cementitious composition. The remainder of the cementitious composition was then placed in the mold and worked manually with a screed to facilitate penetration of the reinforcing material by the cementitious composition. The resulting structures were demolded after 2 days and then allowed to cure at ambient temperature (circa 20° C.) for 95 days before being subjected to testing for flexural strength as follows. A 6" strip was cut from the structure (the cross-section showed the spatial fabric extending throughout the thickness of the structure). The strip was supported at either end by supports placed 5" apart and subjected at its center line to a gradually increasing load. [In the case of Panel 1 the upper surface showed some evidence of water separation ("lens" formation) and the load was applied to the other surface.] The load required to cause rupture at the center line was recorded ("modulus of rupture"). A second 6" strip was cut and treated in exactly the same manner except that the load was increased to the point immediately prior to that at which rupture had occured with the previous strip and the distance by which the center of the strip had been depressed from the horizontal was measured ("center line deflection at max. stress"). Thereafter the load was released and the distance by which the center of the strip remained depressed from the horizontal *immediately* after release was measured ("residual deflection"). The results of these tests are recorded below in TABLE I.

TABLE I

|  | Panel 1 | Panel 2 |
| --- | --- | --- |
| Density: pcf | 88 | 95 |
| Dimensions of test strip | 3.07" × 0.261" × 6.06" | 3.09" × .020" × 6.19" |
| Modulus of rupture: psi | 2240 | 1479 |
| Centerline deflection at max. stress: in | 0.46 | 0.84 |
| Residual deflection: in | 0.19 | 0.45 |

EXAMPLE 2

A load-bearing reinforced structure of the invention (Panel 3) was prepared using a non-woven spatial reinforcing layer (0.76" thick) comprised of randomly oriented extruded polypropylene filaments melt-bonded at points of intersection and having relatively large voids [EROLAN ® matrix available from ARMORTEC, Div. of Nicolon]. The spatial reinforcing layer was provided on its top face with a woven polyester fabric [Milliken Style 1884] which was not physically attached to the reinforcing layer prior to incorporation in the cementitious composition. The latter composition was prepared by thorough mixing of the following ingredients (all amounts in pounds except where stated):

| Cement | 3.89 |
| --- | --- |
| Fly ash | 0.97 |
| Water | 1.7 |
| Sand | 13.56 |
| Air entraining agent (DARAVAIR ®: W. R. Grace Co.) | 0.14 fluid oz. |
| Superplasticiser (WRDA-19: W. R. Grace Co.) | 0.022 |
| Gelling agent (NATROSOL 250H) | 0.012 |
| Dispersing agent (LOMAR D) | 0.012 |

| -continued | |
|---|---|
| Inert fines | 0.025 |

The procedure exmployed to fabricate the structure was exactly that described in Example 1. The resulting structure was demolded after 2 days and allowed to cure at ambient temperature (circa 20° C.) for 95 days and then subjected to the same tests as described in Example 1. The dimensions of the test strip were 3.13"×0.84"×10.88" and the strip was supported using supports 10" apart. The results of the tests are set forth in TABLE II.

| | Panel 3 |
|---|---|
| Dimensions of test strip | 3.13" × 0.84" × 10.88" |
| Density: pcf | 120 |
| Modulus of rupture: psi | 949 |
| Centerline deflection at max. stress: in | 0.66 |
| Residual deflection: in | 0.36 |

Inspection of a cut cross-section of Panel 3 showed the spatial reinforcing layer to be distributed throughout the whole thickness of the cross-section with the face fabrics embedded in the upper and lower surfaces of the structure.

The structures made in accordance with the invention may be used for many applications. For example, they may be used to replace plywood and like sheets in building structures. They can also be used to form roof shells, curtain walls, curved fences, and the like. Prior to assembly, articles made from the panel structures in accordance with the invention may be stored with the panel in either its planar or roll form and later may be assembled at the delivery site or where the article is intended to be used. Such articles are therefore economical to store and ship. The panels may also be used in a flat or nearly flat configuration. The use of a lightweight, high compression strain capacity cement matrix provides a panel having bendability characteristics as good as or better than plywood and like materials.

The terms "cold formed" and "cold formable" as used herein mean that the panels or sheets can be shaped into curved configurations after casting and curing of the panel matrix.

Although specific embodiments of the present invention have been discussed above in some detail, it is to be understood that these are offered for purposes of illustration only. Changes may be made in the described structures and methods for producing them in order to adapt the structures and the methods to any particular application.

What is claimed is:

1. A three-dimensionally reinforced hydraulic cementitious structure comprising at least one layer of nonwoven spatial fabric reinforcing material comprised of randomly oriented substantially continuous fibers, said material being encapsulated in the cementitious composition.

2. A structure according to claim 1 wherein said cementitious composition comprises cement, water and at least one gelling agent, said gelling agent being present in proportions sufficient to impart low water bleed characteristics to said cementitious composition.

3. A structure according to claim 2 wherein said cementitious composition also comprises at least one dispersing agent in a proportion such that the combined effect of the gelling and dispersing agents is sufficient to impart low water bleed characteristics to said cementitious composition.

4. A structure according to claim 1 wherein a plurality of nonwoven fabric reinforcing layers are present.

5. A structure according to claim 4 wherein the nonwoven spatial fabric reinforcing layers are separated from each other by layers of cementitious composition forming a sandwich structure.

6. A structure according to claim 1 wherein said nonwoven spatial fabric reinforcing layer extends throughout substantially the whole of said structure.

7. A structure according to claim 1 wherein said nonwoven spatial fabric reinforcing layer is provided with a scrim fabric reinforcing layer on at least one of its outer surfaces.

8. A structure according to claim 3 wherein said cementitious composition further comprises at least one member selected from the group consisting of air entraining agents, air entrapping agents and prefoamed material in an amount sufficient to render said structure up to 70 percent cellular by volume and to impart thereto a density in the range of about 30 to 120 pcf.

9. A structure according to claim 1 wherein the cementitious composition also comprises an aggregate.

10. A structure according to claim 9 wherein said aggregate is a lightweight aggregate.

11. A structure according to claim 1 wherein the nonwoven spatial fabric reinforcing layer comprises a fleece fabric in which the individual fibers are essentially continuous and randomly oriented and are held in place by bonding at points of intersection.

12. A reinforced structural panel, capable of being converted by bending into a curved structural member without substantial loss of structural strength, comprising:
a nonwoven spatial fabric reinforcing material in which the individual fibers are essentially continuous and randomly oriented;
said material being disposed substantially uniformly throughout a matrix of a cementitious composition.

13. A reinforced structural panel according to claim 12 wherein said cementitious composition comprises cement, water, an aggregate, and at least one gelling agent, the latter agent being present in proportions sufficient to impart low water bleed characteristics to said cementitious composition.

14. A reinforced structural panel according to claim 12 wherein said nonwoven spatial fabric is provided with a scrim fabric reinforcing layer on at least one of its outer surfaces.

15. A reinforced structural panel according to claim 12 wherein said cementitious composition is a cellular hydraulic cement having a density in the range of about 30 to 120 pcf.

16. A reinforced structural panel according to claim 13 wherein said cementitious composition also comprises at least one dispersing agent in a proportion such that the combined effect of the gelling and dispersing agents is sufficient to impart low water bleed characteristics to said cementitious composition.

17. A reinforced structural panel according to claim 16 wherein said gelling and dispersing agents are each present in said cementitious composition in the range of 0.05 percent to 1.5 percent by weight.

18. A load-bearing, substantially planar cementitious structure reinforced in all three dimensions and comprising:
- at least one continuous nonwoven spatial fabric reinforcing material in which the individual fibers are essentially continuous and randomly oriented;
- said fabric reinforcing material being encapsulated in a matrix of a cementitious composition.

19. A load-bearing structure according to claim 18 wherein said cementitious composition comprises a hydraulic cement, water, an aggregate, and at least one gelling agent, the latter agent being present in a proportion sufficient to impart low water bleed characteristics to said cementitious composition.

20. A load-bearing structure according to claim 18 wherein said continuous nonwoven fabric reinforcing material is provided with a scrim fabric reinforcing material on at least one of its outer surfaces.

21. A load bearing structure according to claim 18 wherein said fabric reinforcing material is distributed uniformly throughout said structure.

22. A load-bearing structure according to claim 19 wherein said cementitious composition also comprises at least one dispersing agent in a proportion such that the combined effect of the gelling and dispersing agents is sufficient to impart low water bleed characteristics to said cementitious composition.

* * * * *